United States Patent
Perng et al.

(10) Patent No.: US 7,490,336 B2
(45) Date of Patent: Feb. 10, 2009

(54) COMPUTER AND OPTICAL DRIVE THEREOF

(75) Inventors: Chiy-Ferng Perng, Taipei (TW);
Fei-Wen Sung, Taipei (TW)

(73) Assignee: Asustek Computer Inc., Taipei (TW)

( * ) Notice: Subject to any disclaimer, the term of this patent is extended or adjusted under 35 U.S.C. 154(b) by 344 days.

(21) Appl. No.: 11/210,790

(22) Filed: Aug. 25, 2005

(65) Prior Publication Data

US 2006/0064708 A1    Mar. 23, 2006

(30) Foreign Application Priority Data

Aug. 26, 2004   (TW) ............... 93125642 A

(51) Int. Cl.
*G11B 33/02* (2006.01)

(52) U.S. Cl. ................................. 720/646

(58) Field of Classification Search ............ 720/646, 720/623, 601, 653, 648, 645, 650, 606, 626, 720/602, 685; 361/683, 724
See application file for complete search history.

(56) References Cited

U.S. PATENT DOCUMENTS

| | | | | |
|---|---|---|---|---|
| 4,178,541 A * | 12/1979 | Brihier | ............... | 324/385 |
| 4,373,149 A * | 2/1983 | Coste | ............... | 318/281 |
| 5,278,808 A * | 1/1994 | Takano | ............... | 369/11 |
| 5,553,202 A * | 9/1996 | Wakabayashi et al. | ...... | 358/1.16 |
| 5,584,032 A * | 12/1996 | Hyatt | ............... | 711/100 |
| 5,659,459 A * | 8/1997 | Wakabayashi et al. | ...... | 361/753 |
| 5,689,353 A * | 11/1997 | Darbee et al. | ............... | 398/112 |
| 6,067,400 A | 5/2000 | Saeki et al. | | |
| 6,072,645 A * | 6/2000 | Sprague | ............... | 360/5 |
| 6,271,984 B1* | 8/2001 | Ogawa et al. | ............... | 360/93 |
| 6,545,953 B1 | 4/2003 | Herbert | | |
| 6,567,360 B1* | 5/2003 | Kagawa | ............... | 720/609 |
| 6,671,575 B2* | 12/2003 | Baik | ............... | 700/218 |
| 6,717,802 B2* | 4/2004 | Sa et al. | ............... | 361/683 |
| 7,139,165 B2* | 11/2006 | Sharma et al. | ............... | 361/683 |
| 7,278,147 B2* | 10/2007 | Pen | ............... | 720/646 |
| 2003/0078944 A1* | 4/2003 | Yamauchi et al. | ............... | 707/200 |
| 2003/0201755 A1* | 10/2003 | Briggs et al. | ............... | 320/135 |
| 2004/0174688 A1* | 9/2004 | Lin et al. | ............... | 361/801 |
| 2005/0149956 A1* | 7/2005 | Makino et al. | ............... | 720/601 |
| 2005/0210486 A1* | 9/2005 | Shibata et al. | ............... | 720/652 |
| 2005/0210495 A1* | 9/2005 | Watanabe | ............... | 720/725 |

* cited by examiner

*Primary Examiner*—Allen T Cao
(74) *Attorney, Agent, or Firm*—Birch, Stewart, Kolasch & Birch, LLP

(57) ABSTRACT

An electronic apparatus includes an optical drive and a second housing. In this case, the optical drive has a first housing, a circuit board, a first button, and a second button. The circuit board is disposed in the first housing. The first button is disposed on the first housing and the first button electrically connects with the circuit board. The optical drive is disposed in the second housing. The second button electrically connects with the circuit board with a wire. The second button, which controls the optical drive, is disposed on the second housing.

18 Claims, 4 Drawing Sheets

COMPUTER AND OPTICAL DRIVE THEREOF

BACKGROUND OF THE INVENTION

1. Field of Invention

The invention relates to an electronic apparatus and an optical drive thereof and, in particular, to an electronic apparatus with double controls.

2. Related Art

In recent years, it is common to record information, such as sound, image or personal data, on optical discs. Since optical discs have large storage spaces and are easy to be carried and preserved, people may rapidly exchange information by using optical discs, and gain lots of fun by doing so.

The optical drive, as a reading device for an optical disc, is therefore becoming one of the essential peripheral equipments of computer. In general, as shown in FIG. 1, a conventional optical drive 1, which is disposed in the computer housing 11, has a housing 12 and a tray 13. The tray 13 holds the optical disc and allows the reading and writing processes to be proceeded in the housing 12. To insert or take out an optical disc, users may use a button 14 on the housing 12 to eject the tray from the housing 12, and then take out or change the optical disc.

As users value much more on the appearance of computer mainframes, the design with integrity by covering the optical drive 1 with the computer housing 111 has been revealed these days. A button 14', however, has to be disposed on the computer housing 11 at a position corresponding to that of the button 14 covered therein, and through the function of a linking rod 15, the button 14 on the optical drive 1 is being pressed indirectly when a user presses the button 14' on the computer housing 11. Under the circumstances, the position of the button 14' on the computer housing 11 has to be adjacent to that of the button 14 on the optical disc 1, and cannot be at any other position on the computer housing 11. Accordingly, the design of the computer housing 11 is not fashion enough to attract consumers.

It is therefore an important subject of the invention to provide an electronic apparatus and an optical drive for solving the above mentioned problem of positioning the button on the computer housing.

SUMMARY OF THE INVENTION

In view of the foregoing, the invention is to provide an electronic apparatus and an optical drive thereof, wherein a button for controlling the drive can be disposed at any position on a housing.

To achieve the above, an electronic apparatus of the invention includes an optical drive and a second housing. In the invention, the optical drive has a first housing, a circuit board, a first button and a second button. The circuit board is disposed in the first housing. The first button is disposed on the first housing and electrically connects to the circuit board. The optical drive is disposed in the second housing. The second button electrically connects to the circuit board with a wire and is disposed on the second housing for controlling the optical drive.

To achieve the above, an electronic apparatus of the invention includes a first housing, a circuit board, a first button and a second button. In the invention, the circuit board is disposed in the first housing. The first button is disposed on the first housing and electrically connects to the circuit board. The second button electrically connects to the circuit board with a wire. The first and second buttons are used to control an action of the optical drive.

As mentioned above, the electronic apparatus and optical drive of the invention have a first button and a second button for controlling the actions of the optical drive. Comparing with the conventional art, the second button of the electronic apparatus or the optical drive of the invention electrically connects to the circuit board of the optical drive with a wire. Therefore, the second button can be disposed at any position on the second housing, so that the wire can reach and is not restrained to a position corresponding to that of the first button. As a result, the design of the second housing can be more flexible, which will enhance the integrity of the product so as to attract consumers.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
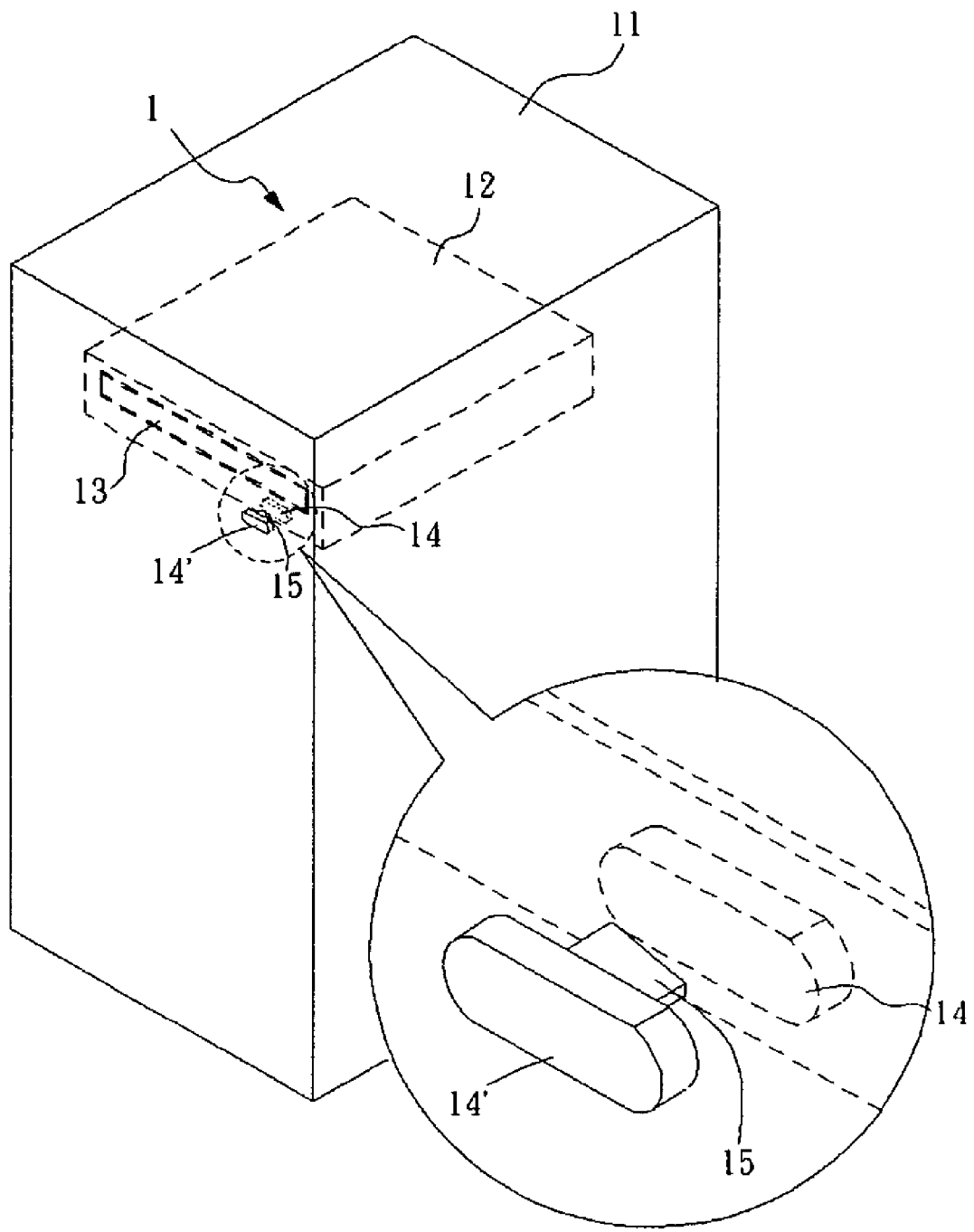
FIG. 1 is a schematic diagram of the conventional optical drive.
Figure 2:
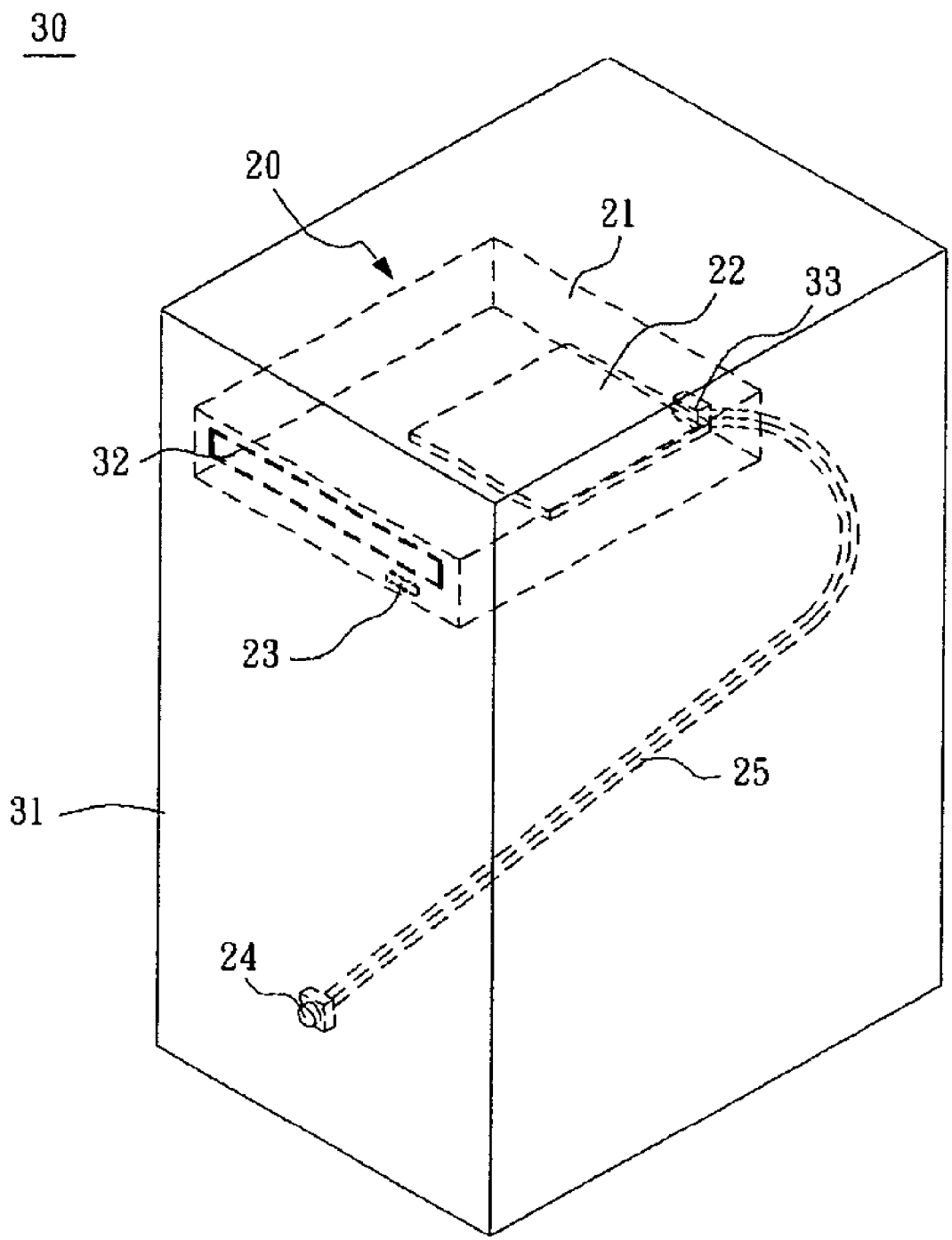
FIG. 2 is a schematic diagram of an electronic apparatus according to a preferred embodiment of the invention.
Figure 3:
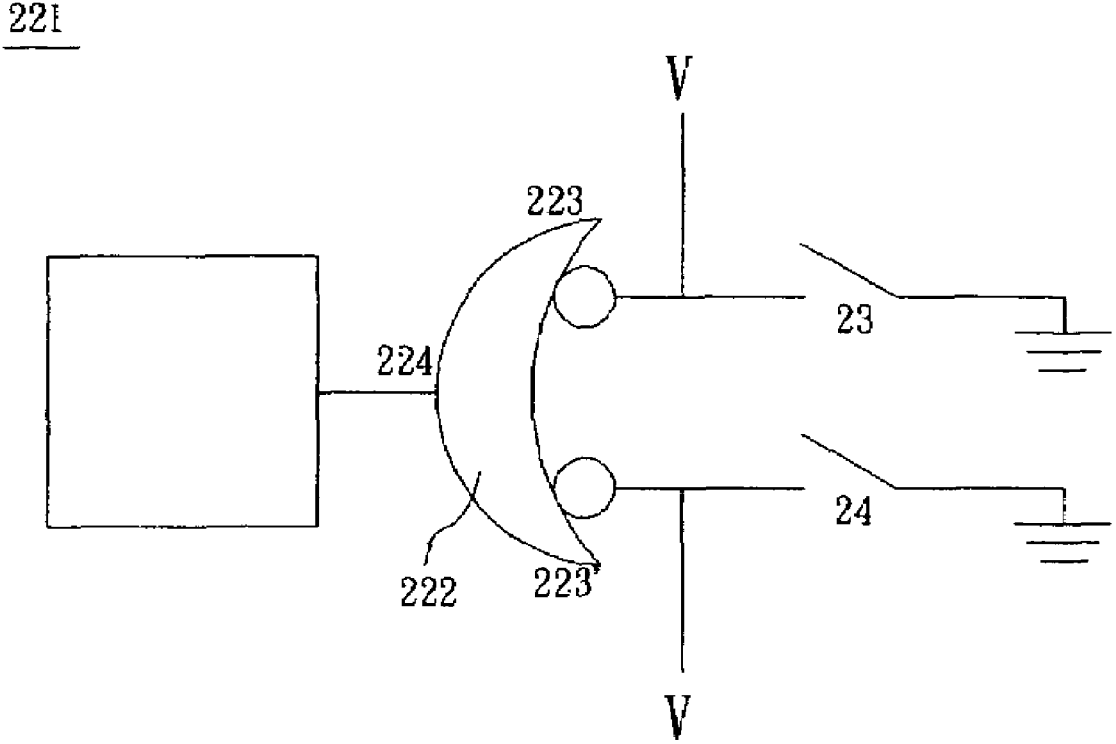
FIG. 3 is a schematic circuit diagram showing a logical design of a double controlling circuit within the electronic apparatus and the optical drive thereof according to the preferred embodiment of the invention.
Figure 4:
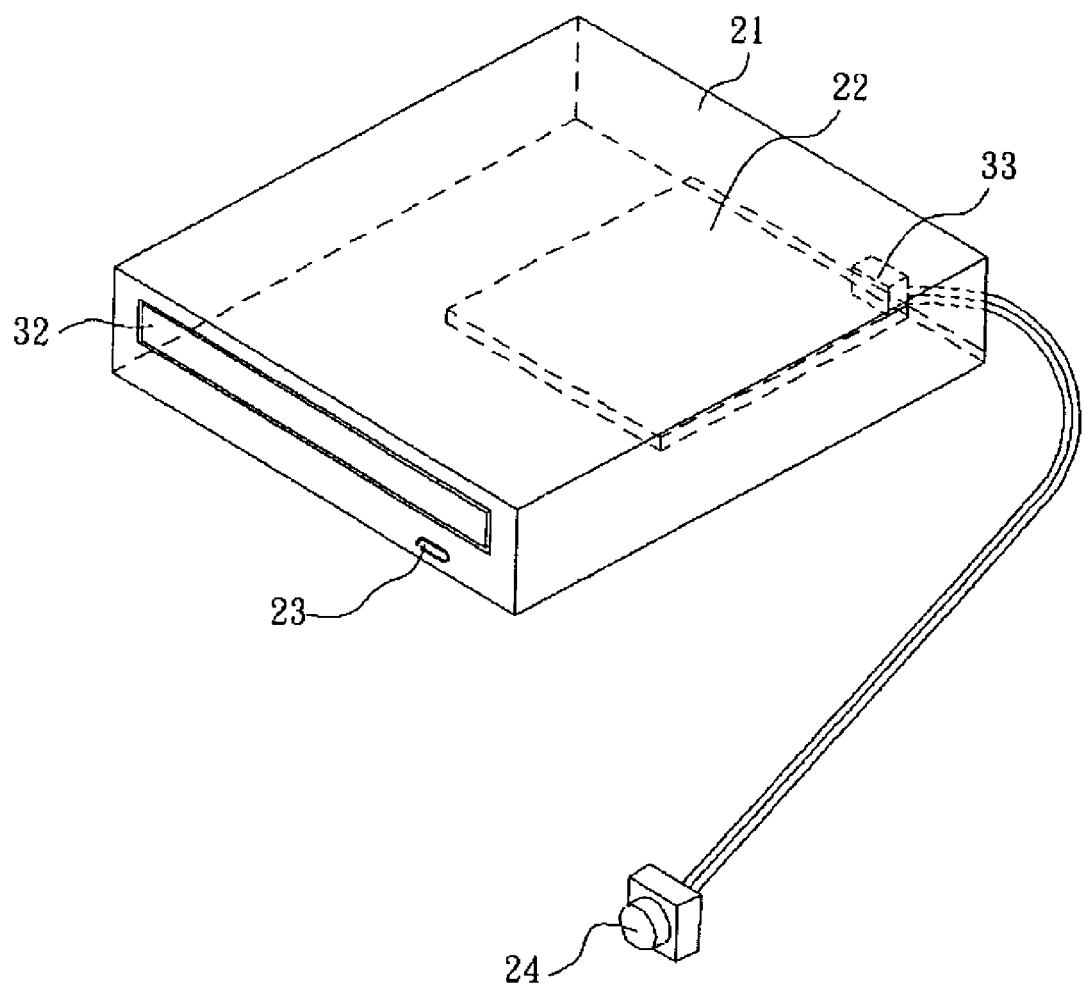
FIG. 4 is a schematic diagram of an optical drive according to a preferred embodiment of the invention.

First, please refer to FIGS. 2 to 4 for illustrating an electronic apparatus according to a preferred embodiment of the invention.

As shown in FIG. 2, an electronic apparatus 30 comprises a second housing 31 and an optical drive 20.

In this embodiment, the second housing 31 is the computer housing, and the optical drive 20 is disposed in the second housing 31.

The optical drive 20 comprises a first housing 21, a circuit board 22, a first button 23 and a second button 24.

The circuit board 22 is disposed in the first housing 21. In this embodiment, the electronic apparatus 30 has a disc tray 32.

The first button 23 is disposed on the first housing 21 and electrically connects to the circuit board 22. By pressing the button 23, a first signal is transmitted to the circuit board 22. In this embodiment, the first signal may control the loading/ejection of the disc tray 32 for performing the loading/ejection action of the optical drive 20, or change the playing status of the optical drive 20 (a playing action).

The second button 24 can be disposed at any position on the second housing 31 and electrically connects to the circuit board 22 with a wire 25 for controlling the optical drive 20. The second button 24, by the connection of the wire 25, may be disposed at any position on the second housing 31 that the wire 25 can reach. In this embodiment, the wire 25 is a twist pair cable. A second signal is transmitted to the circuit board 22 when the second button 24 is pressed. The second signal may control the loading/ejection of the operating the disc tray 32 for performing the loading/ejection action of the optical drive 20, or change the playing status of the optical drive 20 (the playing action).

As shown in FIGS. 2 and 3, the circuit board 22 in this embodiment comprises a double controlling circuit 221 which has an OR gate 222. The OR gate 222 includes two input terminals 223 and 223' and one output terminal 224.

As shown in FIG. 3, the input terminal 223 electrically connects to the first button 23, and the other input terminal 223' electrically connects to the second button 24. In this embodiment, the input terminals 223 and 223' further comprise, respectively, a NOT gate that connects to the OR gate 222. The first button 23 and the second button 24 are grounded respectively.

When a user presses the first button 23 on the first housing 21 and does not press the second button 24, the output terminal 224 transmits a first signal to the circuit board 22 to control the loading/ejection action or the playing action of the optical drive 20.

Further, when a user presses the second button 24 on the second housing 31, the output terminal 224 transmits a second signal to the circuit board 22 to control the loading/ejection action or the playing action of the optical drive 20.

In this case, the first and second signals, which are controlling signals outputted from the output terminal 224 of the OR gate 222, are use to control the loading/ejection of the disc tray 32 or the playing of the optical drive 20. The loading/ejection action of the optical drive 20 can be reached by operating the loading/ejection of the disc tray 32. For example, the disc in the optical drive 20 can be taken out after ejecting the disc tray 32, or the disc can be inserted into the optical drive 20 after placing the disc in the disc tray 32 and then inserting the disc tray 32. To control the playing of the optical drive 20 is to change the mode of the optical drive 20 from "Play Mode" to "Stop Mode" or to "Pause Mode". Besides, the mode thereof could also be changed from "Stop Mode" or "Pause Mode" to "Play Mode".

In this embodiment, the electronic apparatus 30 further comprises a connector 33, such as a jumper or a switch with separated positive and negative electrodes. The connector 33 electrically connects the wire 25 with the circuit board 22. Therefore, the controlling signal can be transmitted to the circuit board 22 from the second button 24 through the wire 25 and the connector 33.

Next, please refer to FIGS. 3 and 4 for illustrating an optical drive according to the preferred embodiment of the invention.

As shown in FIG. 4, the optical drive 20 comprises a first housing 21, a circuit board 22, a first button 23 and a second button 24.

The circuit board 22 is disposed in the first housing 21. In this embodiment, the optical drive 20 further comprises a disc tray 32.

The first button 23 is disposed on the first housing 21 and electrically connects to the circuit board 22. By pressing the button 23, a first signal is transmitted to the circuit board 22. In this embodiment, the first signal may control the loading/ejection of the disc tray 32 for performing the loading/ejection action of the optical drive 20, or change the playing status of the optical drive 20 (a playing action).

As shown in FIG. 3, the second button 24 electrically connects to the circuit board 22 with the wire 25 so as to control the optical drive 20. In this embodiment, the wire 25 is a twist pair cable. A second signal is transmitted to the circuit board 22 by pressing the second button 24. The second signal may control the loading/ejection of the operating the disc tray 32 for performing the loading/ejection action of the optical drive 20, or change the playing status of the optical drive 20 (the playing action).

As shown in FIGS. 3 and 4, the circuit board 22 in this embodiment comprises a double controlling circuit 221 which has an OR gate 222. The OR gate includes two input terminals 223 and 223' and one output terminal 224.

As shown in FIG. 3, the input terminal 223 electrically connects to the first button 23, and the other input terminal 223' electrically connects to the second button 24. In this embodiment, the input terminals 223 and 223' further comprise, respectively, a NOT gate that connects to the OR gate 222. The first button 23 and the second button 24 are grounded respectively.

When a user presses the first button 23 on the first housing 21 and does not press the second button 24, the output terminal 224 transmits a first signal to the circuit board 22 to control the loading/ejection action of the disc tray 32 or the playing action of the optical drive 20.

Further, when a user presses the second button 24 on the second housing 31, the output terminal 224 transmits a second signal to the circuit board 22 to control the loading/ejection of the disc tray 32 or the playing action of the optical drive 20.

In this case, the first and second signals, which are controlling signals outputted from the output terminal 224 of the OR gate 222, are use to control the loading/ejection of the disc tray 32 or the playing of the optical drive 20. The loading/ejection action of the optical drive 20 can be reached by operating the loading/ejection of the disc tray 32. For example, the disc in the optical drive 20 can be taken out after ejecting the disc tray 32, or the disc can be inserted into the optical drive 20 after placing the disc in the disc tray 32 and then inserting the disc tray 32. To control the playing of the optical drive 20 is to change the mode of the optical drive 20 from "Play Mode" to "Stop Mode" or to "Pause Mode". Besides, the mode thereof could also be changed from "Stop Mode" or "Pause Mode" to "Play Mode".

In this embodiment, the electronic apparatus 30 further comprises a connector 33, such as a jumper or a switch with separated positive and negative electrodes. The connector 33 electrically connects the wire 25 with the circuit board 22. Therefore, the controlling signal can be transmitted to the circuit board 22 from the second button 24 through the wire 25 and the connector 33.

In brief, the electronic apparatus and optical drive of the invention have a first button and a second button for controlling the actions of the optical drive. Comparing with the conventional art, the second button of the electronic apparatus or the optical drive of the invention electrically connects to the circuit board of the optical drive with a wire. Therefore, the second button can be disposed at any position on the second housing, so that the wire can reach and is not restrained to a position corresponding to that of the first button. As a result, the design of the second housing can be more flexible, which will enhance the integrity of the product so as to attract consumers.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical drive, comprising:
  a first housing;

a circuit board disposed in the first housing;
a first button disposed on the first housing and electrically connected to the circuit board; and
a second button electrically connected to the circuit board with a wire, wherein either the first button or the second button controls an action of the optical drive, wherein the second button is disposed on a second housing, the first housing is disposed in the second housing, and the second housing is a computer housing.

2. The optical drive according to claim 1, wherein either the first button or the second button controls a loading/ejection action and/or a playing action of the optical drive.

3. The optical drive according to claim 1, wherein the circuit board comprises a double controlling circuit having an OR gate, the OR gate has two input terminals and one output terminal, one of the input terminals electrically connects to the first button, the other one of the input terminals electrically connects to the second button, and the output terminal transmits a controlling signal to control a loading/ejection action and/or a playing action of the optical drive.

4. The optical drive according to claim 1, wherein a first signal is transmitted to the circuit board when the first button is pressed.

5. The optical drive according to claim 4, wherein the first signal control a loading/ejection action and/or a playing action of the optical drive.

6. The optical drive according to claim 1, wherein a second signal is transmitted to the circuit board when the second button is pressed.

7. The optical drive according to claim 6, wherein the second signal controls a loading/ejection action and/or a playing action of the optical drive.

8. The optical drive according to claim 1, further comprising:
a connector electrically connecting the wire with the circuit board.

9. The optical drive according to claim 8, wherein the wire is a twisted pair cable.

10. A computer, comprising:
an optical drive, which comprises a first housing, a circuit board, a first button, and a second button, wherein the circuit board is disposed in the first housing; the first button being disposed on the first housing and electrically connected to the circuit board; the second button being electrically connected to the circuit board with a wire; and
a second housing, wherein the optical drive is disposed therein and the second button is disposed thereon for controlling the optical drive, wherein the first housing is disposed in the second housing, and the second housing is a computer housing.

11. The computer according to claim 10, wherein either the first button or the second button controls a loading/ejection action and/or a playing action of the optical drive.

12. The computer according to claim 11, wherein the circuit board comprises a double controlling circuit having an OR gate, the OR gate has two input terminals and one output terminal, one of the input terminals electrically connects to the first button, the other one of the input terminals electrically connects to the second button, and the output terminal transmits a controlling signal to control the loading/ejection action and/or the playing action of the optical drive.

13. The computer according to claim 10, wherein a first signal is transmitted to the circuit board when the first button is pressed.

14. The computer according to claim 13, wherein the first signal controls a loading/ejection action and/or a playing action of the optical drive.

15. The computer according to claim 10, wherein a second signal is transmitted to the circuit board when the second button is pressed.

16. The computer according to claim 15, wherein the second signal controls a loading/ejection action and/or a playing action of the optical drive.

17. The computer according to claim 10, further comprising: a connector electrically connecting the wire with the circuit board.

18. The computer according to claim 17, wherein the wire is a twisted pair cable.

* * * * *